(12) United States Patent
Kasai

(10) Patent No.: US 8,890,981 B2
(45) Date of Patent: Nov. 18, 2014

(54) METHOD AND APPARATUS FOR ELIMINATING CROSSTALK AMOUNT INCLUDED IN AN OUTPUT SIGNAL

(75) Inventor: Masanori Kasai, Kanagawa (JP)

(73) Assignee: Sony Corporation, Tokyo (JP)

( * ) Notice: Subject to any disclaimer, the term of this patent is extended or adjusted under 35 U.S.C. 154(b) by 561 days.

(21) Appl. No.: 13/058,777

(22) PCT Filed: May 6, 2010

(86) PCT No.: PCT/JP2010/057757
§ 371 (c)(1),
(2), (4) Date: Feb. 11, 2011

(87) PCT Pub. No.: WO2011/001738
PCT Pub. Date: Jan. 6, 2011

(65) Prior Publication Data
US 2011/0134288 A1    Jun. 9, 2011

(30) Foreign Application Priority Data

Jun. 30, 2009    (JP) ................ P2009-154676

(51) Int. Cl.
*H04N 5/217*    (2011.01)
*H04N 9/04*    (2006.01)
*H04N 9/64*    (2006.01)

(52) U.S. Cl.
CPC ........... *H04N 9/646* (2013.01); *H04N 9/045* (2013.01)
USPC ........................... 348/241; 348/231.99

(58) Field of Classification Search
CPC ..... H04N 5/361; H04N 5/3575; H04N 5/378; H04N 9/045; G06T 5/001
USPC ............................. 348/241, 231.99
See application file for complete search history.

(56) References Cited

U.S. PATENT DOCUMENTS 7,106,912 B2 *    9/2006    Kokubo et al. ............... 382/274
7,561,194 B1 *    7/2009    Luo ............................... 348/241

(Continued)

FOREIGN PATENT DOCUMENTS

CN    101437166 A    5/2009
EP    1 021 033 A2    7/2000

(Continued)

OTHER PUBLICATIONS

Extended European Search Report issued Jul. 27, 2012, in Munich in corresponding European Application No. EP 10 79 3909.
English language translation of the International Search Report from the Japanese Patent Office for International Application No. PCT/JP2010/057757 (Mail date Aug. 10, 2010).

*Primary Examiner* — Twyler Haskins
*Assistant Examiner* — Fayez Bhuiyan
(74) *Attorney, Agent, or Firm* — Finnegan Henderson Farabow Garrett & Dunner LLP

(57) ABSTRACT

An image processing device includes: a crosstalk amount calculating unit for calculating an evaluation value of crosstalk amount included in an output signal from a pixel to be corrected in an imaging device; a crosstalk correction coefficient calculating unit for calculating a crosstalk correction coefficient based on the evaluation value output from said crosstalk amount calculating unit; and a crosstalk correcting unit for eliminating crosstalk amount included in an output signal of said pixel to be corrected, using said crosstalk correction coefficient, wherein the crosstalk correcting unit subtracts, from an output signal of a pixel to be corrected, a value obtained by multiplying the output signal of a pixel adjacent to said pixel to be corrected by said crosstalk correction coefficient, thereby eliminating amount of crosstalk.

14 Claims, 22 Drawing Sheets

(56) References Cited

U.S. PATENT DOCUMENTS

| | | | |
|---|---|---|---|
| 8,125,543 B2 * | 2/2012 | Cho | 348/241 |
| 8,314,863 B2 * | 11/2012 | Tachi | 348/241 |
| 2006/0262078 A1 * | 11/2006 | Inuzuka et al. | 345/102 |
| 2007/0131855 A1 | 6/2007 | Banton et al. | |
| 2007/0222724 A1 * | 9/2007 | Ueno et al. | 345/87 |
| 2008/0130991 A1 | 6/2008 | O'Brien et al. | |
| 2008/0180557 A1 * | 7/2008 | Egawa et al. | 348/294 |
| 2009/0096887 A1 | 4/2009 | Tamaoki | |
| 2009/0122165 A1 | 5/2009 | Kinoshita | |
| 2009/0128671 A1 * | 5/2009 | Kusaka | 348/246 |
| 2011/0102635 A1 * | 5/2011 | Fukunaga et al. | 348/231.99 |

FOREIGN PATENT DOCUMENTS

| | | |
|---|---|---|
| EP | 1 288 906 A2 | 3/2003 |
| EP | 2 061 231 A2 | 5/2009 |
| JP | 2000-188761 | 7/2000 |
| JP | 2008-113236 | 5/2008 |
| JP | 2009-100203 | 5/2009 |
| JP | 2009-124282 | 6/2009 |
| KR | 10-2009-0049540 | 5/2009 |
| WO | WO 2009/057114 A2 | 5/2009 |

* cited by examiner

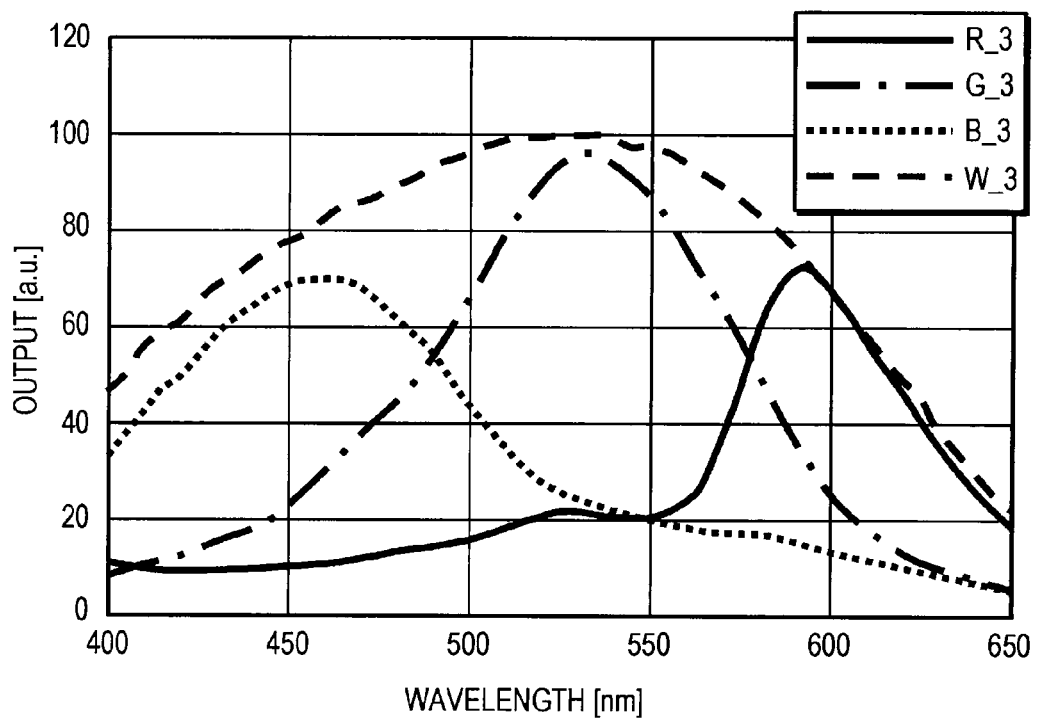
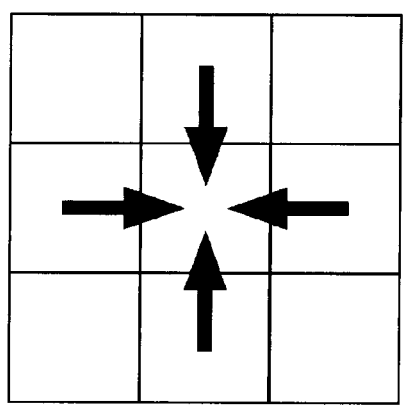

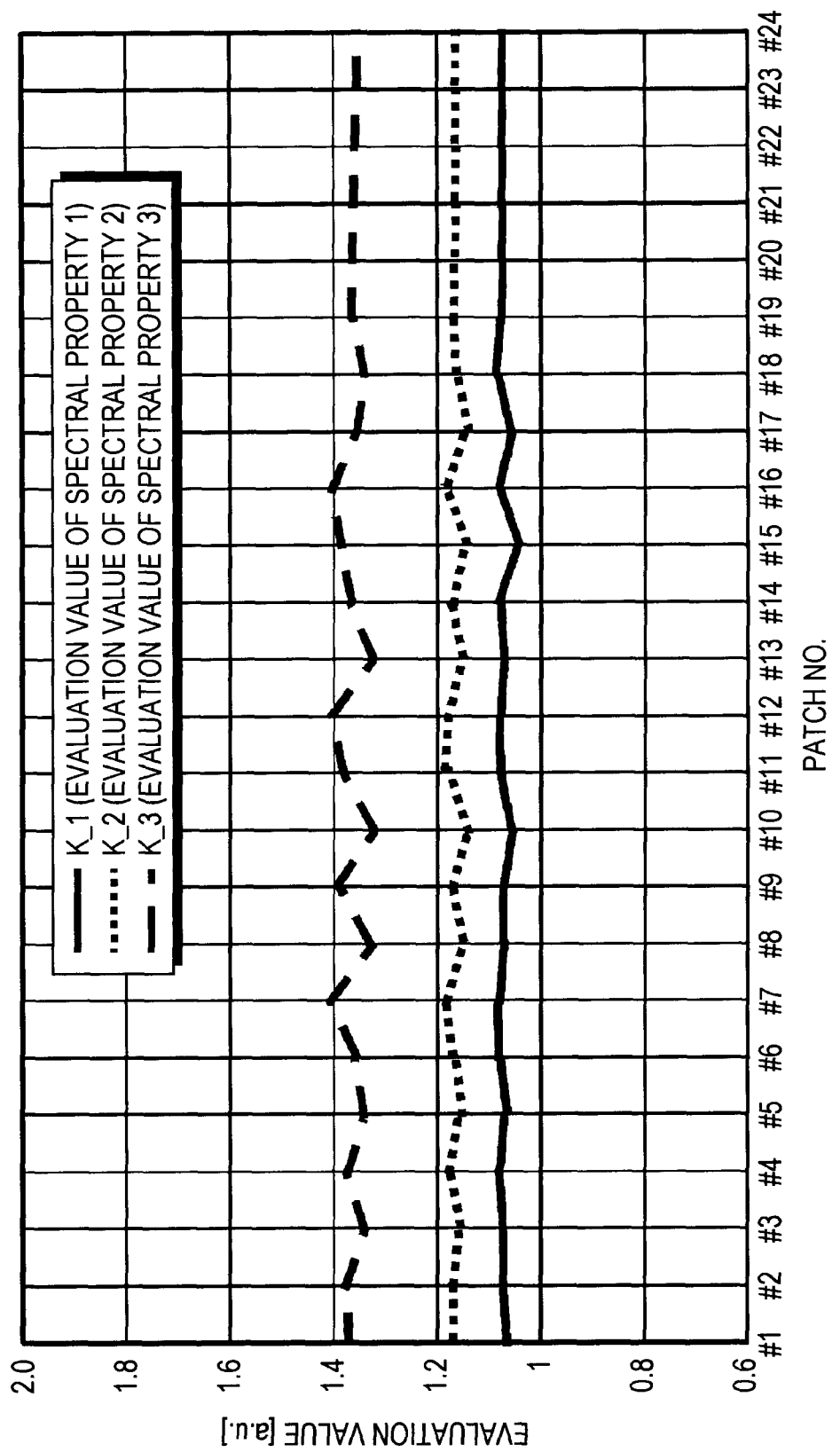

FIG. 12A
- PRIOR ART -

| G | B | G | B |
|---|---|---|---|
| R | G | R | G |
| G | B | G | B |
| R | G | R | G |

FIG. 12B
- PRIOR ART -

| G | W | G | W |
|---|---|---|---|
| W | B | W | R |
| G | W | G | W |
| W | R | W | B |

FIG. 13A

| W | B | W | G |
|---|---|---|---|
| B | W | G | W |
| W | G | W | R |
| G | W | R | W |

FIG. 13B

| G | W | G | W |
|---|---|---|---|
| W | R | W | R |
| G | W | G | W |
| W | B | W | B |

FIG. 13C

| Cy | W | Cy | W |
|----|----|----|----|
| W | Ye | W | Ye |
| Cy | W | Cy | W |
| W | Ye | W | Ye |

FIG. 14

METHOD AND APPARATUS FOR ELIMINATING CROSSTALK AMOUNT INCLUDED IN AN OUTPUT SIGNAL

TECHNICAL FIELD

The present invention relates to an image processing device and image processing method, an imaging apparatus, and a computer program, wherein output signals from an imaging device having a color filter with color coding are processed, an particularly relates to an image processing device and image processing method, an imaging apparatus, and a computer program, wherein output signals from an imaging device using white pixels in color coding are processed.

BACKGROUND ART

The camera has a long history as a means to record visual information. As of recent, digital cameras which perform digital encoding of images captured with a solid state imaging device such as a CCD (Charge Coupled Device) or CMOS (Complementary Mental-Oxide Semiconductor) or the like has become widespread, replacing silver-salt cameras which take pictures using film or photosensitive plates. Digital cameras are advantageous in that images subjected to digital encoding are stored in memory and image processing and image management can be performed by computer, and further, that there is no problem of the life expectancy of film. Currently, many digital still cameras, digital video cameras, digital cameras implemented in cellular phones and PDAs (Personal Digital Assistants), and monitoring cameras, use solid state devices.

Either imaging devices of CCD and CMOS are configured with an arrangement wherein two-dimensionally arrayed pixels (photodiodes) use photoelectric effect to convert light into electric charge. The surface of each pixel has a color pixel of one of three colors of R (red), green (G), blue (B), for example, and signal charge corresponding to the amount of incident light passing through each color filter is accumulated in each pixel. The color filters are band-pass filters which pass light of a predetermined wavelength. Signal charges according to the amount of incident light of each color are read out from each pixel, and the color of incident light at each pixel position can be reproduced from the amount of signal charge of each of the three colors.

As of recent, with the advance in miniaturization technology, higher resolution of imaging devices has advanced. However, miniaturizing pixels due to high resolution leads to the concern that sensitivity will decrease due to decrease in the amount of charge accumulated at each pixel. One method that has been proposed to realize high sensitivity is color coding of an array including "white (WHITE) pixels) that do not include an optical band-pass filter on the pixel (e.g., see NPL 1). High sensitivity pixels such as white pixels have a feature that the sensitivity to incident light is higher as compared to chromatic pixels, and the sensitivity properties can be improved in a low-illuminance environment (e.g., see PTL 1).

FIG. 12A illustrates a Bayer array which is a representative filter array of primary colors. Also, FIG. 12B illustrates an example of a filter array including white pixels. Here, in the drawing, R represents Red (red) color filters, G represents Green (green) color filters, B represents Blue (blue) color filters, and W represents White (white) color filters, respectively. In the example illustrated in the drawing, white pixels are introduced between the RGB primary color system color filters in an intermittent manner.

Also, with miniaturization of pixels, there is concern that optical and electrical crosstalk, i.e., color mixing (hereinafter referred to simply as "crosstalk") will occur between adjacent. Factors of crosstalk include leaking of light which should be collected at the adjacent pixel, electrons leaking between pixels, and so forth.

Crosstalk leads to deterioration in resolution and loss of color information, and accordingly needs to be corrected. Now, crosstalk is not a problem unique to imaging devices using color filters including white pixels in the array. However, a greater amount of light leaks from white pixels, so deterioration of images due to crosstalk is more marked as compared to imaging devices using color filters not including white pixels in the array.

Even with the same imaging device, the amount of crosstalk varies depending on optical conditions such as individual micro-lenses. This is because crosstalk is dependent on the incident angle. Accordingly, the amount of crosstalk differs depending on the position of the pixels on the chip face. Also, the depth of penetration into the silicon (Si) substrate configuring the imaging device differs depending on the wavelength of the light, so the amount of crosstalk also changes depending on the color temperature of the light source at the time of shooting.

For example, a signal processing method has been proposed which handles change in crosstalk owing to optical conditions, by performing corresponding processing as to signals of a pixel of interest using signals of each of multiple surrounding pixels adjacent to a pixel of interest of the imaging device, and correction parameters set independently for each of the signals (e.g., see PTL 2). However, with this signal processing method, the values of the correction parameters are set in accordance with the aperture of the diaphragm included in the optical system guiding light from the subject to the imaging device. That is to say, the lens to be used is already decided, the amount of crosstalk according to the lens has been measured beforehand, and correction is performed as to this. Accordingly, correction of the amount of crosstalk is difficult with a situation where lens information is unknown, such as with exchangeable lenses wherein the user can freely exchange lenses.

CITATION LIST

Patent Literature

PTL 1: Japanese Unexamined Patent Application Publication No. 2007-288490
PTL 2: Japanese Unexamined Patent Application Publication No. 2007-142697

Non Patent Literature

NPL 1: Y. Egawa, "A White-RGB CFA-Patterned CMOS Image Sensor with Wide Dynamic Range" (2008 IEEE International Solid-State Circuits Conference (ISSCC) P. 52-53)

SUMMARY OF INVENTION

Technical Problem

It is an object of the present invention to provide an excellent image processing device and image processing method, imaging apparatus, and computer program, wherein output signals from an imaging device using white pixels in color coding can be suitably processed.

It is another object of the present invention to provide an excellent image processing device and image processing method, imaging apparatus, and computer program, which can suitably perform correction processing of the amount of crosstalk included in output signals from an imaging device using white pixels in color coding.

It is a further object of the present invention to provide an excellent image processing device and image processing method, imaging apparatus, and computer program, which can suitably perform correction processing of the amount of crosstalk included in output signals from an imaging device using white pixels in color coding, even in a situation wherein optical conditions, such as a lens to be used, and so forth, are unknown.

Solution to Problem

The present application has been made in consideration of the above problems, and an invention of the present application is an image processing device including:

a crosstalk amount calculating unit for calculating an evaluation value of crosstalk amount included in an output signal from a pixel to be corrected in an imaging device;

a crosstalk correction coefficient calculating unit for calculating a crosstalk correction coefficient based on the evaluation value output from the crosstalk amount calculating unit; and a crosstalk correcting unit for eliminating crosstalk amount included in an output signal of the pixel to be corrected, using the crosstalk correction coefficient.

The crosstalk amount calculating unit of the image processing device is configured to calculate the evaluation value of crosstalk amount included in an output signal of the pixel to be corrected, based on output signals from the imaging device.

The crosstalk amount calculating unit of the image processing device is configured to calculate the evaluation value of crosstalk amount included in an output signal of the pixel to be corrected, based on the relation of output signals between adjacent pixels.

The imaging device is configured to use color coding including white pixels. Crosstalk is not a problem unique to imaging devices using color filters including white pixels in the array, but a greater amount of light leaks from white pixels, so deterioration of images due to crosstalk is more marked as compared to imaging devices using color filters not including white pixels in the array. In such a case, the crosstalk amount calculating unit may be configured to calculate an evaluation value for crosstalk amount included in an output signal of a pixel to be corrected, based on the proportion of the sum of the signal amount of the pixels other than white, as to the signal amount of white pixels.

More specifically, the crosstalk amount calculating unit may be configured to calculate an evaluation value for the relative amount of crosstalk included in an output signal of a pixel to be corrected, based on the proportion of the sum of values obtained by multiplying the signal amounts of each of RGB pixels by respective predetermined coefficients ($\alpha, \beta, \gamma$), as to a value obtained by multiplying the signal amount of white pixels by a predetermined coefficient ($\epsilon$).

The crosstalk amount calculating unit a is configured to calculate an evaluation value of crosstalk amount, with N×N pixels as an increment of processing (where N is a positive integer).

The image processing device is configured further including memory for storing evaluation values which the crosstalk amount calculating unit has calculated in increments of processing, wherein the crosstalk correction coefficient calculating unit and the crosstalk correction unit respectively perform calculation of correction coefficients and correction of crosstalk, using the evaluation values calculated using previous frames saved in the memory.

The crosstalk correction coefficient calculating unit of the image processing device is configured to calculate beforehand a relational expression between the evaluation value of crosstalk amount calculated by the crosstalk amount calculating unit, and correction coefficients, and at the time of an evaluation value output from the crosstalk amount calculating unit being output, references the relational expression and calculates a correction coefficient corresponding to the evaluation value.

The crosstalk correction unit of the image processing device is configured to subtract, from an output signal of a pixel to be corrected, a value obtained by multiplying the output signal of a pixel adjacent to the pixel to be corrected by the correction coefficient, thereby eliminating amount of crosstalk.

The imaging device of the image processing device has disposed a plurality of arrays for calculating evaluation values including white pixels, in an array not including white pixels.

The crosstalk amount calculating unit of the image processing device is configured to use each of the arrays for calculating evaluation values to calculate evaluation values of crosstalk amount occurring at relevant positions. Also, the crosstalk correction coefficient calculating unit is configured to calculate a crosstalk correction coefficient based on the evaluation value output from the crosstalk amount calculating unit, for each position where an array for calculating evaluation values is disposed. Also, the crosstalk correcting unit is configured to perform correction of crosstalk using a relevant coefficient, within an array for calculating evaluation values, and performs correction of crosstalk using a crosstalk correction coefficient determined based on an evaluation value of crosstalk amount obtained from a nearby array for calculating evaluation values, in a region outside of an array for calculating evaluation values.

Also, an invention of the present application is an image processing method including:

a crosstalk amount calculating step for calculating an evaluation value of crosstalk amount included in an output signal from a pixel to be corrected in an imaging device;

a crosstalk correction coefficient calculating step for calculating a crosstalk correction coefficient based on the evaluation value output in the crosstalk amount calculating step; and a crosstalk correcting step for eliminating crosstalk amount included in an output signal of the pixel to be corrected, using the crosstalk correction coefficient.

Also, an invention of the present application is an imaging apparatus including:

an imaging device including a color coding color filter; and a signal processing unit for processing output signals of the imaging device;

wherein the signal processing unit includes a crosstalk amount calculating unit for calculating an evaluation value of crosstalk amount included in an output signal from a pixel to be corrected in the imaging device, a crosstalk correction coefficient calculating unit for calculating a crosstalk correction coefficient based on the evaluation value output from the crosstalk amount calculating unit, and a crosstalk correcting unit for eliminating crosstalk amount included in an output signal of the pixel to be corrected, using the crosstalk correction coefficient.

Also, an invention of the present application is a computer program described in a computer-readable format so as to execute processing of output signals from an imaging device having a color coding color filter, the computer program causing the computer to function as:

a crosstalk amount calculating unit for calculating an evaluation value of crosstalk amount included in an output signal from a pixel to be corrected in the imaging device, a crosstalk correction coefficient calculating unit for calculating a crosstalk correction coefficient based on the evaluation value output from the crosstalk amount calculating unit, and a crosstalk correcting unit for eliminating crosstalk amount included in an output signal of the pixel to be corrected, using the crosstalk correction coefficient.

The computer program of the present application defines a computer program described in a computer-readable format so as to realize predetermined processing on a computer. In other words, by installing the computer program of the present application into a computer, cooperative effects are manifested on the computer, whereby operation effects the same as with the image processing device of the present application can be obtained.

Advantageous Effects of Invention

According to the present invention, an excellent image processing device and image processing method, imaging apparatus, and computer program, wherein the crosstalk amount included in output signals of an imaging device using white pixels in color coding can be suitably corrected, even under conditions where optical conditions, such as the lens being used, are unknown, can be provided.

With the invention of the present application, even if there is no optical information while shooting, an evaluation value for telling the crosstalk amount can be calculated from the shooting data alone, and correction processing of crosstalk can be performed using correction coefficients applied to this evaluation value.

With the invention of the present application, crosstalk amount is calculated based on output signals from the imaging device, so crosstalk correction can be performed even under conditions where optical conditions such as the lens being used are unknown, and also, crosstalk correction can be performed by digital signal processing.

With the invention of the present application, in the case of using color coding in which white pixels and pixels of other colors such as RGB are adjacent, an evaluation value of crosstalk amount at a pixel to be corrected can be calculated based on the proportion of the sum of the signal amount of adjacent RGB pixels as to the signal amount of white pixels, employing the fact that phenomena from the vertical direction and horizontal direction are dominant.

With the invention of the present application, crosstalk amount evaluation values can be calculated in real time by making N=4 for example, i.e., 4×4 pixels is the smallest increment. In this case, pixels of the same color within a processing increment have two or more outputs, so an average value of signal amount can be used for each color. Also, in the event that there is no need to calculate correction coefficients with fine granularity, or in cases where there is no need to calculate correction coefficients in a single imaged image such as with application to moving images, a relatively large block around N=100, i.e., 100×100 pixels may be used as the processing increment.

With the invention of the present application, calculation of correction coefficients and crosstalk correction can be performed using evaluation values calculated using previous frames, so moving image processing can be handled.

With the invention of the present application, correction coefficients can be calculated from evaluation values output from the crosstalk amount calculating unit, based on a relational expression calculated beforehand between crosstalk amount evaluation values and correction coefficients.

With the invention of the present application, a value obtained by multiplying the output signal of a pixel adjacent to a pixel to be corrected is subtracted from the output signal of a pixel to be corrected, whereby amount of crosstalk can be eliminated.

With the invention of the present application, the degree of crosstalk over the entire imaging device face can be known by evaluating each crosstalk amount using each array for calculating evaluation values. Crosstalk can be suitably corrected by then determining a correction coefficient in each region based on the crosstalk amount evaluation value obtained from a nearby array for calculating evaluation value.

Further objects, features, and advantages of the present invention will become apparent from detailed description made based on later-described embodiments of the present invention and the attached drawings.

BRIEF DESCRIPTION OF DRAWINGS

FIG. 3C is a diagram illustrating an example of spectral properties of the imaging device 12 for each color pixel (degree of crosstalk great) (spectral properties 3).

FIG. 4A is a diagram illustrating the way in which crosstalk occurs from the vertical direction and horizontal direction.

FIG. 7B is a diagram illustrating evaluation values obtained for all Macbeth color patches, with regard to each spectral property according to the crosstalk amount (FIG. 3A through FIG. 3C).

FIG. 12A is a diagram illustrating a Bayer array which is a representative filter array for a primary color system.

FIG. 12B is a diagram illustrating an example of a filter array including white pixels.

FIG. 13A is a diagram illustrating another example of a filter array including white pixels.

FIG. 13B is a diagram illustrating another example of a filter array including white pixels.

FIG. 13C is a diagram illustrating another example of a filter array using a complementary color filter.

FIG. 14 is a diagram illustrating an example of a filter array wherein arrays including white pixels such as shown in FIG. 12B, are scattered throughout a Bayer array not including white pixels (see fog. 12A).

DESCRIPTION OF EMBODIMENTS

The following is a detailed description of embodiments of the present invention, with reference to the drawings.

Figure 1:
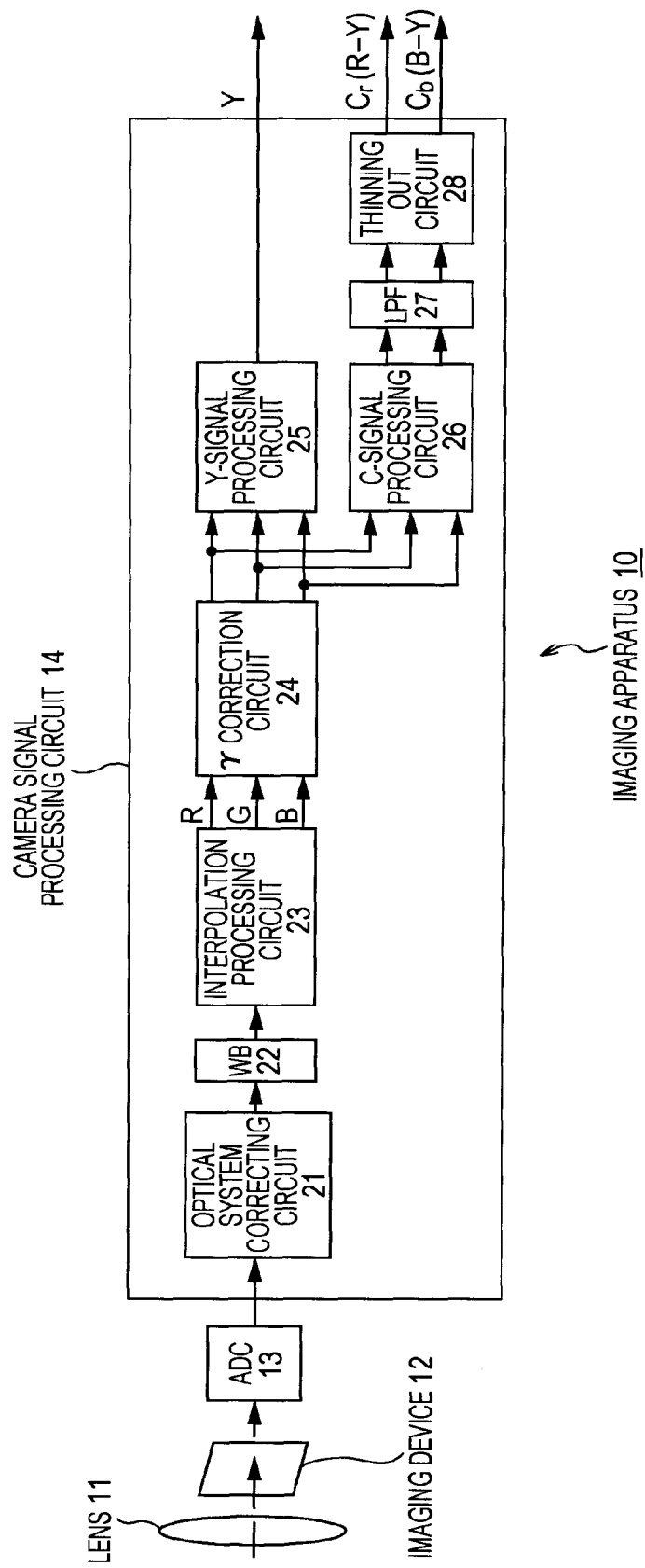
FIG. 1 is a diagram schematically illustrating the hardware configuration of an imaging apparatus 100 serving as an embodiment of the present invention.

FIG. 1 schematically illustrates the hardware configuration of an imaging apparatus 10 serving as an embodiment of the present invention. Note that imaging apparatus as used here includes imaging devices, camera modules including an optical system for imaging image light on an imaging face (light-receiving face) of the imaging device and a signal processing circuit for the imaging device, camera apparatuses such as digital still cameras and video cameras in which the camera module is implemented, and electronic equipment such as cellular phones.

In FIG. 1, image light from a subject (not shown) is imaged on the imaging face of an imaging device 12 by an optical system, an imaging lens 11 for example. For the imaging device 12, an imaging device is used which is formed by a great number pixels including photoelectric converting devices being arrayed two-dimensionally in matrix fashion, and a color filter including color components of a primary color for creating luminance components, and other color components, are disposed on the surface of the pixels. A color filter is a band-pass filter which passes light of predetermined wavelengths.

The imaging device having a color filter may be any of a charge-transfer imaging device of which a CCD is representative, an X-Y address imaging device of which a MOS is representative, or the like.

Also, the color filter includes green (G) for example as a color components serving as a primary component for creating a luminance (Y) component, and red (R) and blue (B) for example as other color components, respectively, and performs color coding so as to reproduce color of incident light at each pixel position. With the present embodiment, color coding of an array including white pixels is performed for the color filter, in order to realize high sensitivity and so forth. However, the array of pixels is not restricted to that shown in FIG. 12B. Note that an arrangement may be made wherein as color components serving as a primary component for creating the Y component, white, cyan, yellow, or the like are used, and magenta, cyan, yellow, or the like, are used for other color components.

With the imaging device 12, of the incident image light, only light of each color component passes through the color filters and is input to each pixel. The light that has been input to each pixel is subjected to photoelectric conversion by photoelectric converters such as photodiodes. This is then read out from each pixel as analog image signals, converted into digital image signals at an A/D converter (ADC) 13, and input to a camera signal processing circuit 14 which is equivalent to the image processing device according to the present invention.

The camera signal processing circuit 14 is configured of an optical system correcting circuit 21, a WB (white balance) circuit 22, an interpolation processing circuit 23, a gamma (γ) correction circuit 24, a Y (brightness) signal processing circuit 25, a C (chroma) signal processing circuit 26, a band limiting LPF (low-pass filter) 27, a thinning out circuit 28, and so forth.

The optical system correcting circuit 21 performs correction of the imaging device 12 and optical system, such as digital clamping to match the black level with the digital image signals input to the camera signal processing circuit 14, defect correction for correcting defects of the imaging device 12, shading correction for correcting light falloff at edges for the imaging lens 11, and so forth.

As described above, the color filter used with the imaging device according to the present embodiment includes white pixels, so the problem of crosstalk becomes pronounced, and accordingly there is the need to perform correction thereof.

While the point of performing calculation and correction of crosstalk amount at the stage of digital signal processing is a main feature of the present invention, the function thereof cam be implemented within the optical system correcting circuit 21. Details of calculation and correction of crosstalk amount will be described later.

The WB circuit 22 subjects image signals which have passed through the optical system correcting circuit 21 to processing for adjusting the white balance, such that RGB is the same as to a white subject. The interpolation processing circuit 23 creates pixels with different spatial phases by interpolation, i.e., creates three planes from RGB signals with spatially shifted phases (RGB signals at the same spatial position).

The gamma (γ) correction circuit 24 subjects the RGB signals at the same spatial position to gamma correction, and then supplies to the Y-signal processing circuit 25 and C-signal processing circuit 26. Gamma correction is processing for applying a predetermined gain to each of the R, G, and B color signals output from the WB circuit 22, such that the photoelectric conversion properties of the entire system, including the imaging device 12 and downstream image reproducing means and so forth, are 1, so as to correctly express the color tone of the subject.

The Y-signal processing circuit 25 creates brightness (Y) signals from the R, G, and B color signals, and the C-signal processing circuit 26 creates Cr (R−Y) and Cb (B−Y) from the R, G, and B color signals.

The band limiting LPF 27 is a filter wherein the cutoff frequency $f_c$ is ⅛ of the sampling frequency $f_s$ for example, and drops the passing band for color difference signals Cr and Cb from (½) $f_s$ to (⅛) $f_s$. However, this is output for TV signal format, and in the event that output is performed without band limitation, frequency signals of ⅛ $f_s$ or higher will be output as false color signals. The thinning out circuit 28 performs thinning out of sampling of the color difference signals Cr and Cb.

Figure 2:
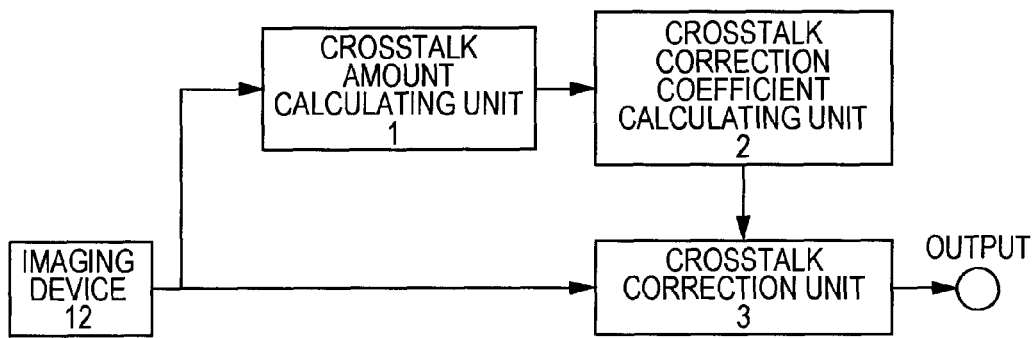
FIG. 2 is a diagram illustrating a functional configuration for performing image signal processing for crosstalk correction.

With the imaging apparatus 10 shown in FIG. 1, the color filter used for the imaging device includes white pixels, so the problem of crosstalk becomes pronounced. The present embodiment is configured that calculation and correction of the crosstalk amount is performed at the stage of digital signals correction. FIG. 2 illustrates the functional configuration for performing image signal processing for crosstalk correction. The image signal processing is configured of a crosstalk amount calculating unit 1, a crosstalk correction coefficient calculating unit 2, and a crosstalk correction unit 3, and is implemented in the optical system correction circuit 21.

The crosstalk amount calculating unit 1 will be described first. The crosstalk amount calculating unit 1 performs quantification of the degree of crosstalk as the crosstalk amount, based on imaged data output from the imaging device 12.

Figure 3A:
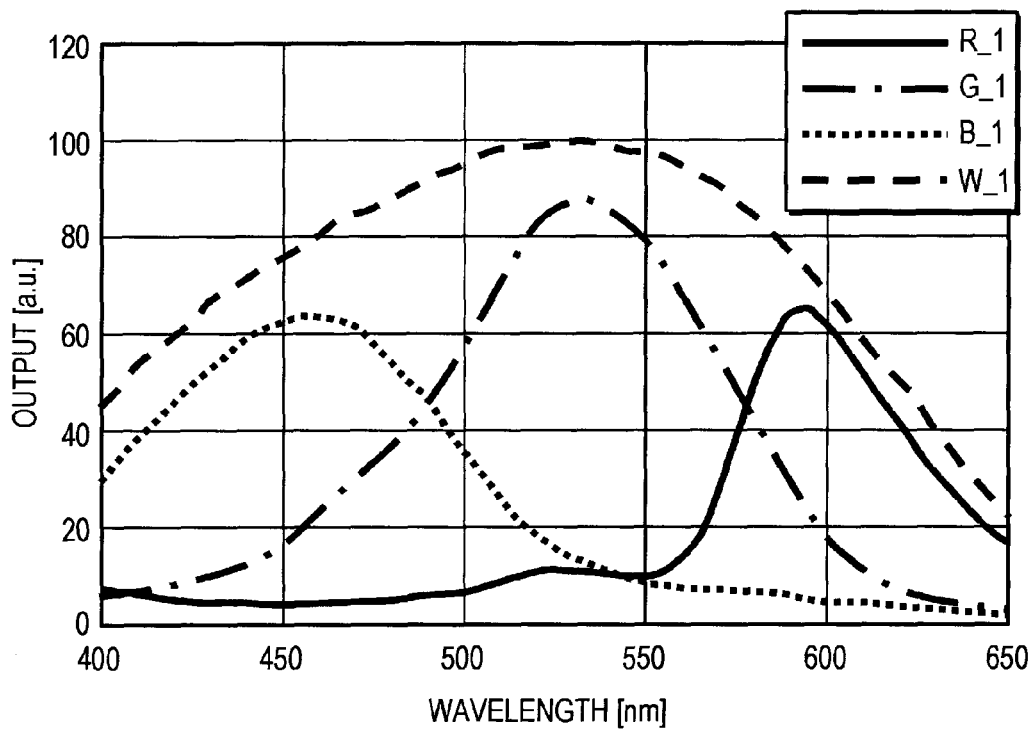
FIG. 3A is a diagram illustrating an example of spectral properties of an imaging device 12 for each color pixel (degree of crosstalk small) (spectral properties 1).
Figure 3B:
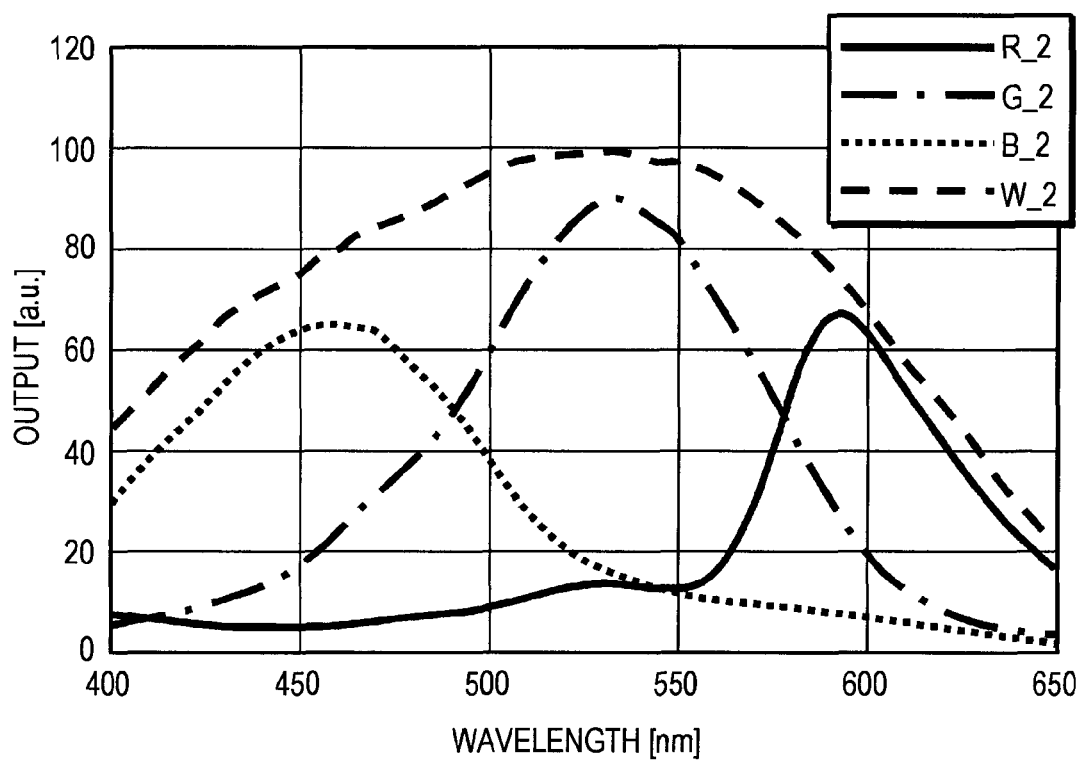
FIG. 3B is a diagram illustrating an example of spectral properties of the imaging device 12 for each color pixel (degree of crosstalk medium) (spectral properties 2).

FIG. 3 illustrates examples of spectral properties for each color pixel of the imaging device 12. In the example shown in the drawing, the degree of crosstalk increases in the order of FIG. 3A, FIG. 3B, and FIG. 3C. Blue (B) is a filter which passes around 450 nanometers, Green (G) is a filter which passes around 550 nanometers, and red (R) is a filter which passes around 650 nanometers. Also, white (W) pixels are the same as with a monochrome imaging device with no color filter. When the crosstalk amount increases, the output at frequency regions where there should be no sensitivity increases. For example, in FIG. 3C, the output and the band of 550 to 650 nanometers has increased at the waveform for blue (B_3) pixels, due to crosstalk.

Figure 4B:
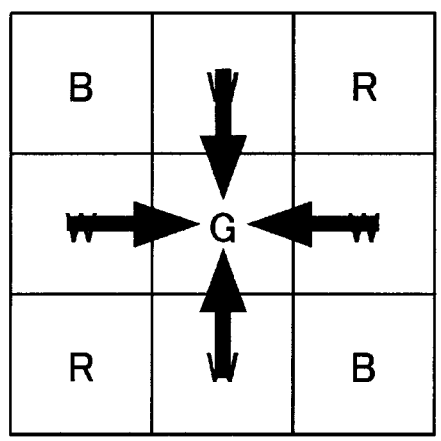
FIG. 4B is a diagram illustrating the way in which white signals mix into adjacent RGB signals in the color pixel array shown in FIG. 12B.
Figure 4C:
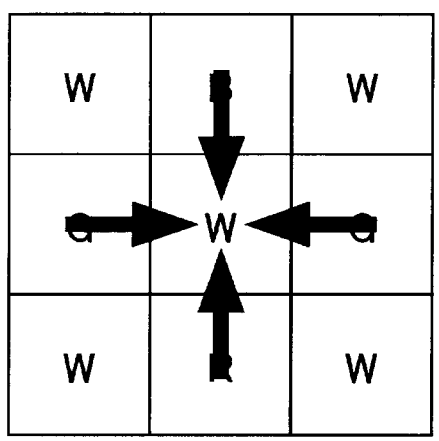
FIG. 4C is a diagram illustrating the way in which RGB signals mix into adjacent white signals in the color pixel array shown in FIG. 12B.
Figure 5A:
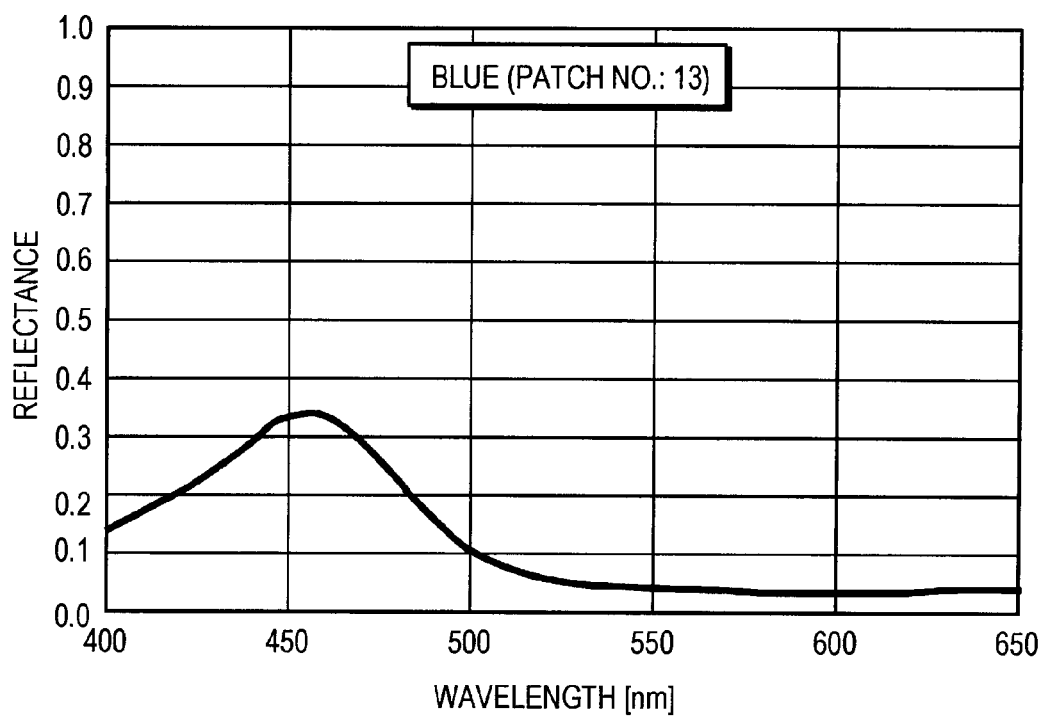
FIG. 5A is a diagram illustrating reflectance spectral properties of a blue patch (patch No. 13) in the Macbeth Color Checker chart.
Figure 5B:
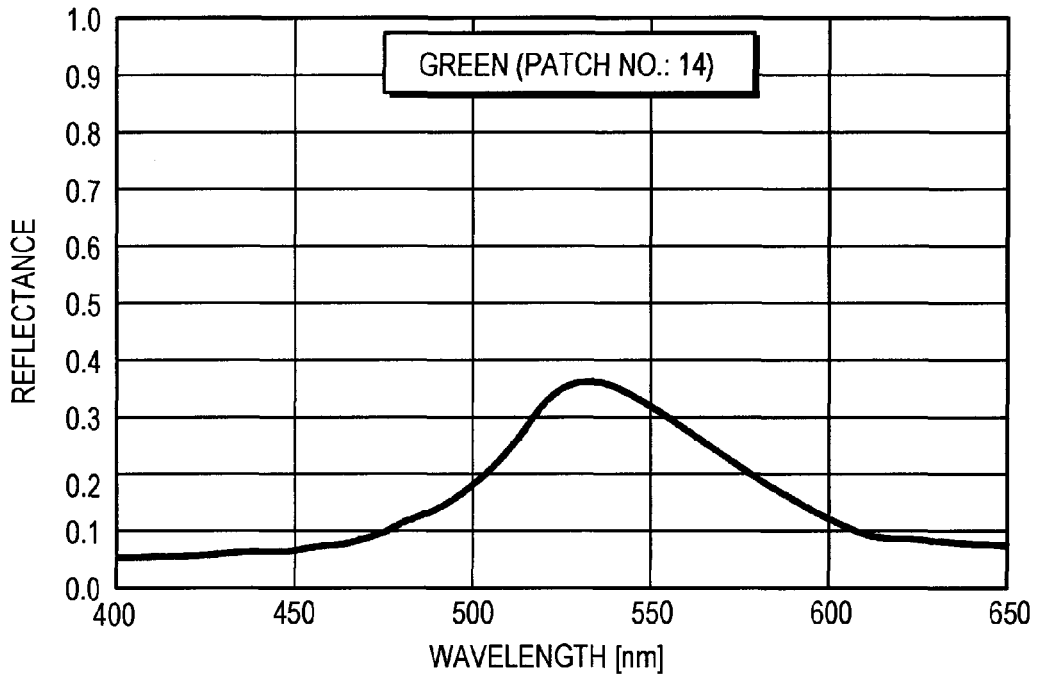
FIG. 5B is a diagram illustrating reflectance spectral properties of a green patch (patch No. 14) in the Macbeth Color Checker chart.
Figure 5C:
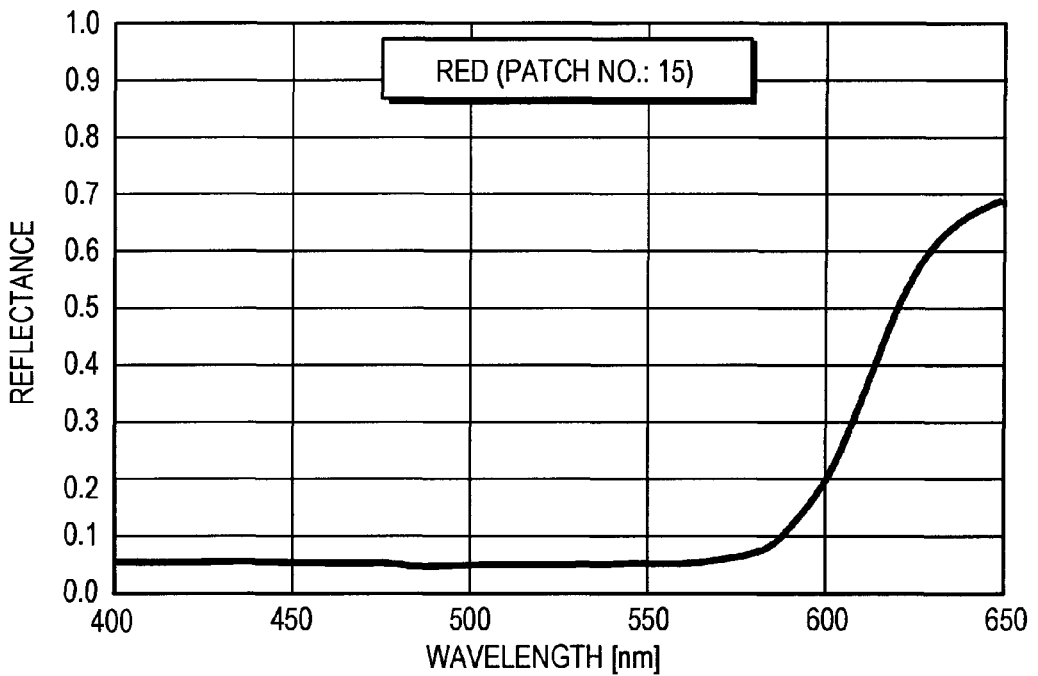
FIG. 5C is a diagram illustrating reflectance spectral properties of a red patch (patch No. 15) in the Macbeth Color Checker chart.
Figure 5D:
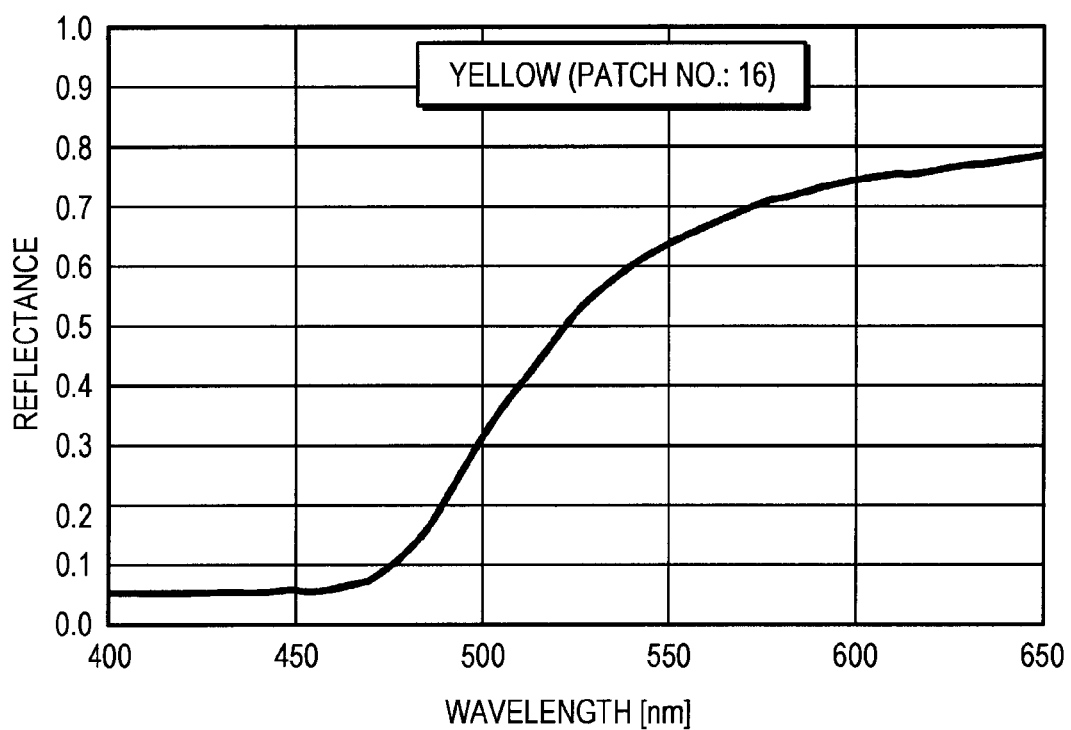
FIG. 5D is a diagram illustrating reflectance spectral properties of a yellow patch (patch No. 16) in the Macbeth Color Checker chart.
Figure 5E:
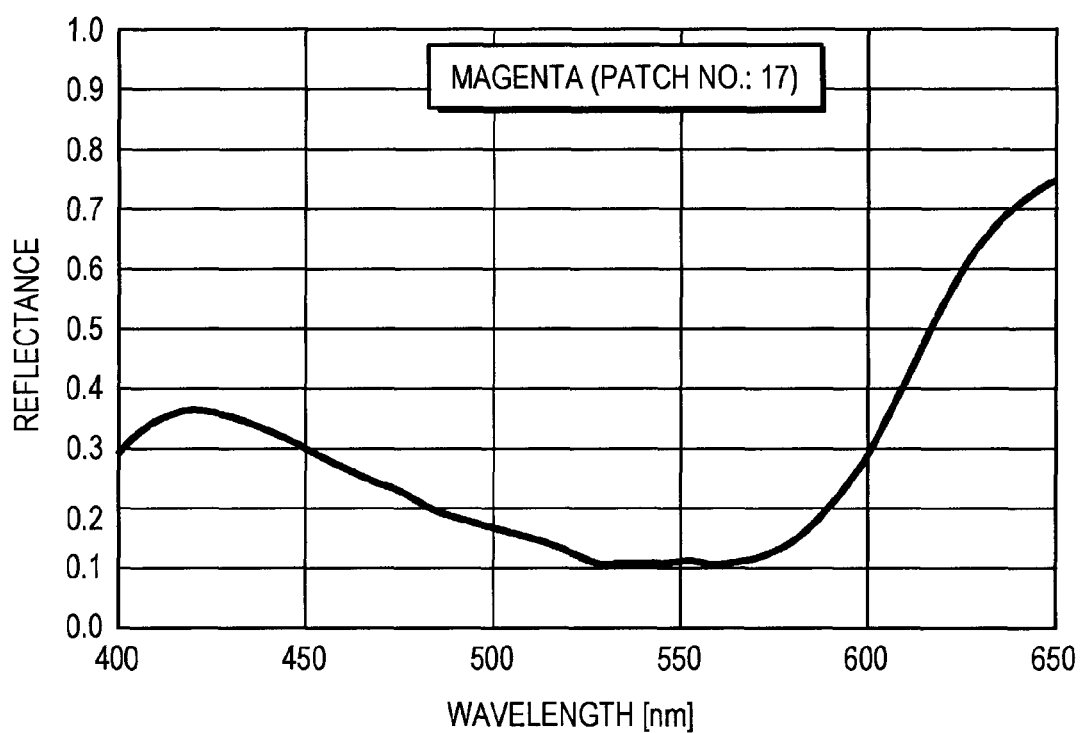
FIG. 5E is a diagram illustrating reflectance spectral properties of a magenta patch (patch No. 17) in the Macbeth Color Checker chart.
Figure 5F:
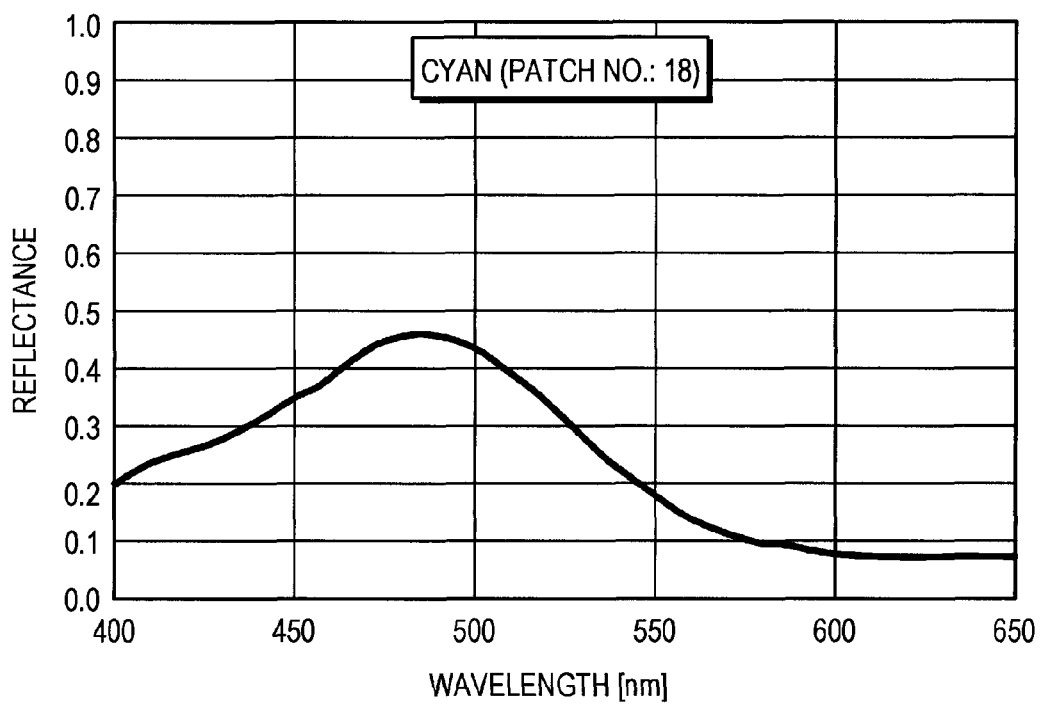
FIG. 5F is a diagram illustrating reflectance spectral properties of a cyan patch (patch No. 18) in the Macbeth Color Checker chart.

Now, with a color filter array such as shown in FIG. 12B, the white pixels and each of the RGB pixels are next to each other. Generally, with crosstalk, phenomena from the vertical direction and horizontal direction are dominant as shown in FIG. 4B. Crosstalk can be generally divided into two types, i.e., one where white signals are mixed into adjacent RGB signals, as shown in FIG. 4B, and one where RGB signals are mixed into adjacent white signals, as shown in FIG. 4C.

Using the nature shown in FIG. 4 enables the crosstalk amount to be known in a relative manner. The method thereof is to calculate the proportion between the sum of the signal amount of each of the signals, and the signal amount of the white signals (described later).

Now, in the field of color imaging, including digital cameras foremost, generally a "Macbeth Color Checker (Macbeth Color chart)" is used for evaluating color reproducibility. For example, "Color Imaging", edited by the Color Science Association of Japan (pp 29-33) describes that spectral sensitivity, tone reproduction, and the three primary colors are factors governing color reproducibility, and that a method is generally used in which these factors are not separately evaluated in color reproducibility evaluation but rather the color reproducibility finally obtained is evaluated, and that as for the evaluation method, a standard color chart is input as an image and the output reproduced colors are compared with the colors of the original color chart by spectral reflectivity (transmissivity), and that the Macbeth Color chart is widely used as the color chart. A Macbeth Color chart is made up of 24 colors including 6 shades of gray. The surface of each color chart is matte, and is of a size of 45 mm×45 mm. This literature lists the reflective spectral properties (spectral reflectivity) of the Macbeth Color chart as appendix Tables A.1 and A.2. Description will be made below using this spectral data.

FIGS. 5A through 5F illustrate the reflective spectral properties of each patch of blue (patch No. 13), green (patch No. 14), red (patch No. 15), yellow (patch No. 16), magenta (patch No. 17), and cyan (patch No. 18) in the Macbeth Color Checker chart. Note that the reason that only the above six colors of the 24 colors in the Macbeth Color chart are used is due to the fact that these six colors are the primary color components used in many color imaging systems.

Multiplying the reflectance spectral properties of these Macbeth Color charts (FIG. 5A through FIG. 5F) by the spectral properties of the color filters of the imaging device 12 shown in FIGS. 3A through 3C at each wavelength component and obtaining the sum, i.e., integration thereof, represents the output of each floor form the imaging device 12.

Figure 6A:
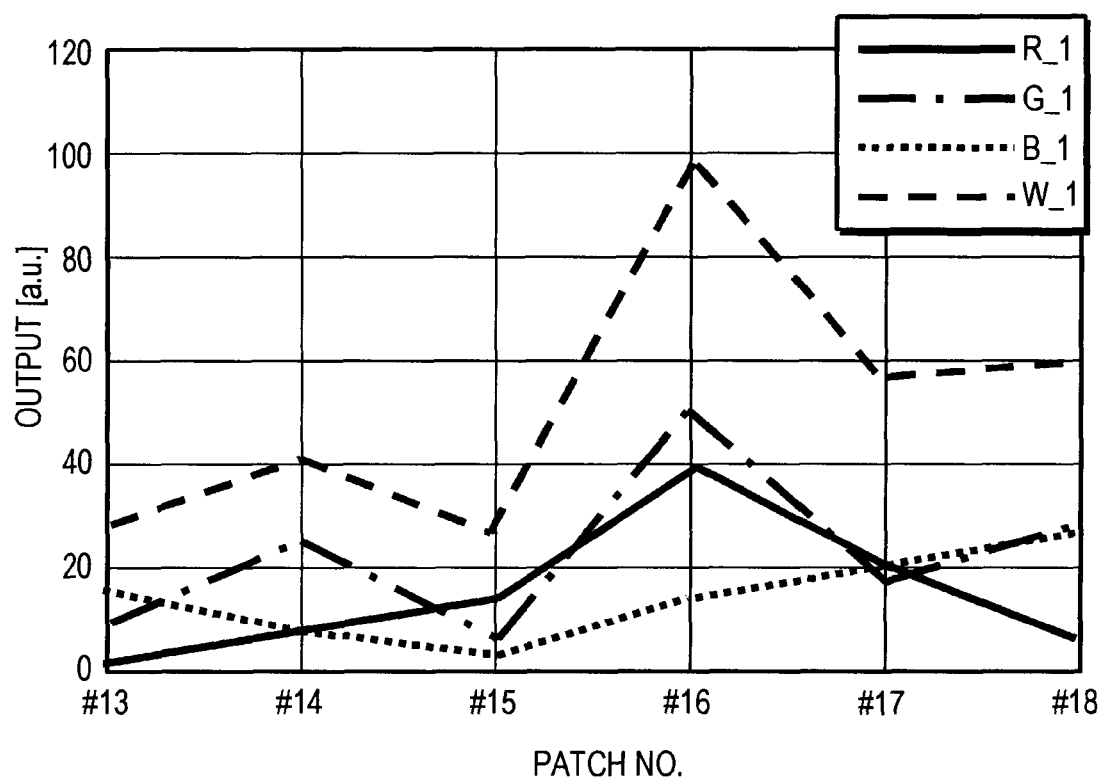
FIG. 6A is a diagram illustrating the results of integrating the reflectance spectral properties of each Macbeth color path shown in FIG. 5A through FIG. 5F with spectral properties corresponding to the crosstalk amount for each color pixel of the imaging device 12 shown in FIG. 3A (spectral properties 1).
Figure 6B:
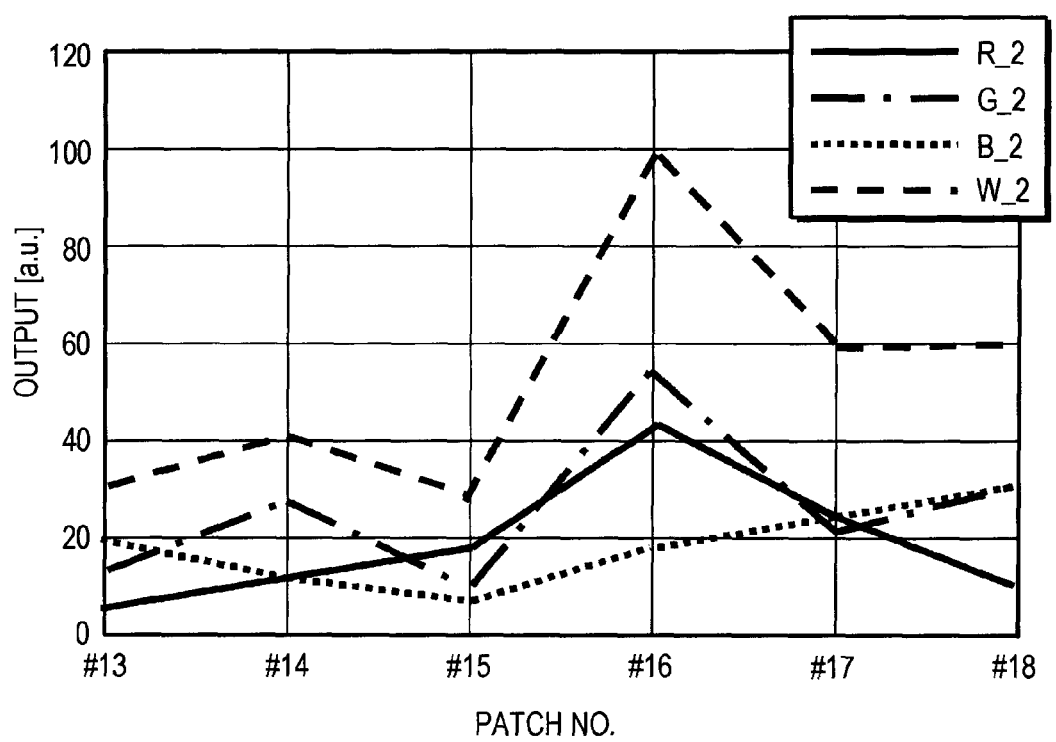
FIG. 6B is a diagram illustrating the results of integrating the reflectance spectral properties of each Macbeth color path shown in FIG. 5A through FIG. 5F with spectral properties corresponding to the crosstalk amount for each color pixel of the imaging device 12 shown in FIG. 3B (spectral properties 2).
Figure 6C:
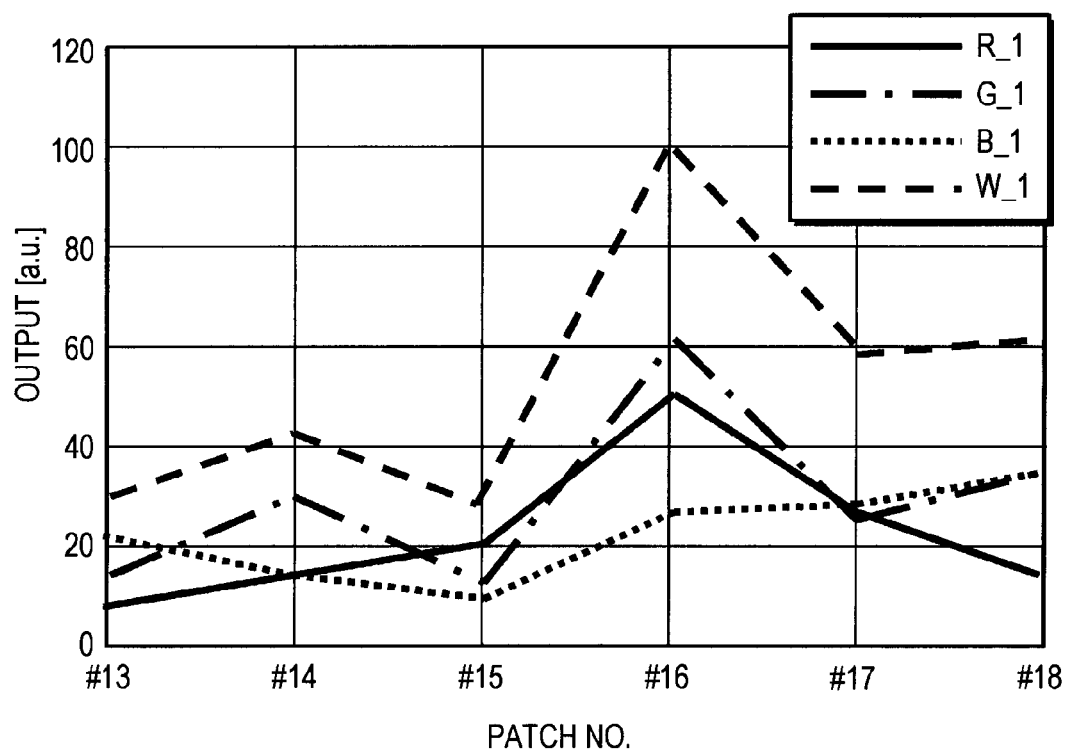
FIG. 6C is a diagram illustrating the results of integrating the reflectance spectral properties of each Macbeth color path shown in FIG. 5A through FIG. 5F with spectral properties corresponding to the crosstalk amount for each color pixel of the imaging device 12 shown in FIG. 3C (spectral properties 3).

FIG. 6A through FIG. 6C illustrate the results of integrating the reflectance spectral properties of each Macbeth color patch shown in FIG. 5A through FIG. 5F with the spectral properties of each color pixel of the imaging device shown in FIG. 3A through FIG. 3C, respectively. Put simply, FIG. 6A through FIG. 6C are equivalent to output corresponding to the crosstalk amount of each color pixel of the imaging device 12.

An evaluation value (K) for evaluation the crosstalk amount can be calculated using the following Expression (1) for example, based on the output (see FIG. 6A through FIG. 6C) for each of the color pixels (R, G, B, W) of the imaging device 12 obtained from the spectral properties (see FIG. 3A through FIG. 3C) according to the crosstalk amount of each color pixel of the imaging device 12.

[Mathematical Expression 1]

$$K = \frac{\alpha R + \beta G + \gamma B}{\varepsilon W} \quad (1)$$

In the above Expression (1), R, G, b, and W are output values of each of the color pixels (see FIG. 6A through 6C), α, β, γ, and ε are arbitrary coefficients, and the evaluation value (K) is equivalent to the result of calculating the proportion of the sum of output of each of the RGB color pixels as to the output for the white pixels. This expression is based on the fact that with the color coding shown in FIG. 12B for example, crosstalk can be generally divided into two types; one where white signals are mixed into adjacent RGB signals, as shown in FIG. 4B, and one where RGB signals are mixed into adjacent white signals, as shown in FIG. 4C (described above).

Calculation of the evaluation value (K) shown in the above Expression (1) is performed for output according to crosstalk amount of each color pixel of the imaging device 12 (see FIG. 6A through 6C), for each patch of the Macbeth Color chart, whereby an evaluation value can be obtained for each Macbeth color patch, with regard to each spectral property corresponding to crosstalk amount (FIG. 3A through FIG. 3C) can be obtained.

Figure 7A:
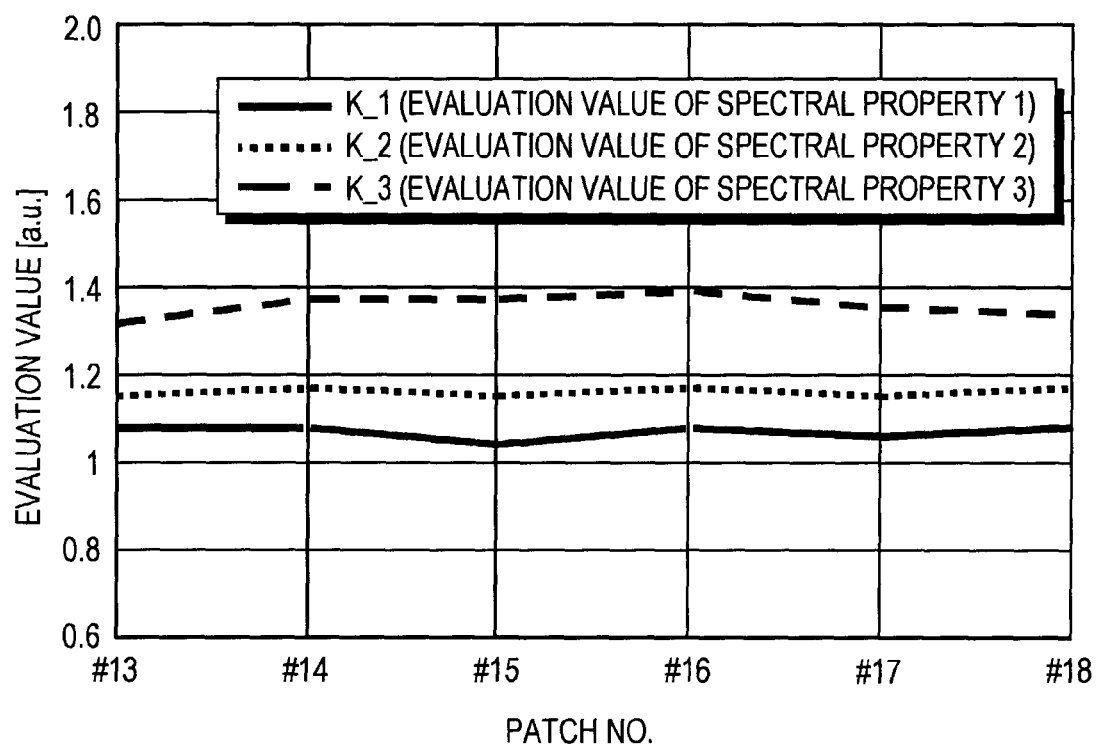
FIG. 7A is a diagram illustrating evaluation values obtained for each Macbeth color patch for the primary six colors, with regard to each spectral property according to the crosstalk amount (FIG. 3A through FIG. 3C).

FIG. 7A illustrates evaluation values obtained for each Macbeth color patch, with regard to each spectral property corresponding to crosstalk amount (FIG. 3A through FIG. 3C). Also, the average and standard deviation for the evaluation values K_1, K_2, and K_3 obtained for each of the spectral properties 1 through 3 over all six color patches have been compiled in the following table.

TABLE 1

|     | Average | Standard deviation |
| --- | --- | --- |
| K_1 | 1.06 | 0.016 |
| K_2 | 1.15 | 0.012 |
| K_3 | 1.35 | 0.027 |

From the above table, it can be seen that the evaluation value (K) is generally constant, regardless of the reflectance properties of the subject (each color). This means that the evaluation value (K) calculated from the above Expression (1) is capable of being used in evaluating crosstalk amount.

Note that the coefficients α, β, γ, and ε are optimized such that the evaluation value (K) is constant in ideal spectral properties where the crosstalk amount is small, as shown in FIG. 3A, for example. In reality, an approximation method such as least square or the like is used. The obtained value is used as to other spectral properties such as in FIG. 3B and FIG. 3C, as well. In FIG. 7A, the evaluation value (K) has been calculated using the coefficient values shown in the following Expression (2).

[Mathematical Expression 2]

$$\alpha = \beta = \gamma = \varepsilon = 1 \quad (2)$$

The reason that only the above six colors of the 24 colors in the Macbeth Color chart are used in the above description is due to the fact that these six colors are the primary color components used in many color imaging systems (described above). The present inventors performed calculation of evaluation values for each of the spectral properties, using the Macbeth Color chart for all 24 colors, for the sake of assurance. FIG. 7B illustrates the results. Also, the average and standard deviation for the evaluation values K_1, K_2, and K_3 obtained for each of the spectral properties 1 through 3 over all 24 color patches have been compiled in the following table. Since the evaluation value (K) is generally constant regardless of the reflectance properties of the subject (each color), it can be reconfirmed that the evaluation value (K) calculated from the above Expression (1) is capable of being used in evaluating crosstalk amount.

TABLE 2

|     | Average | Standard deviation |
| --- | --- | --- |
| K_1 | 1.07 | 0.010 |
| K_2 | 1.16 | 0.011 |
| K_3 | 1.35 | 0.025 |

With the above description, it can be understood that relative change in crosstalk amount can be detected by calculating the evaluation value (K) using output signals from the imaging device 12 using color coding in which white pixels are added to RGB pixels. That is to say, the degree of crosstalk amount can be detected from the output signals of the imaging device 12 alone, with no need to measure the crosstalk amount within the chip beforehand as has been conventional done (e.g., see PTL 2). Accordingly, the degree of crosstalk can be quantized at the state of digital signal processing, even in a situation wherein optical conditions, such as the lens to be used, are unknown.

With the crosstalk amount calculating unit 1, output signals of pixels of all colors including the white pixels are necessary, as can be understood from the above Expression (1). Accordingly, in the case of calculating the evaluation value (K) in real time as to the imaging device 12 having a filter array such as shown in FIG. 12B, the value of around 4×4 pixels is preferably handled as the minimum increment. Pixels of the same color within a processing increment have two or more outputs, so the average value of signal amount is preferably used to calculate the above Expression (1).

Next, the crosstalk correction coefficient calculating unit 2 will be described. At the crosstalk correction coefficient calculating unit 2, a crosstalk correction coefficient corresponding to the current crosstalk amount is calculated from the crosstalk amount output from the crosstalk amount calculating unit 1 and a relational expression between the crosstalk correction coefficient and crosstalk amount obtained beforehand.

First, a general crosstalk correction processing method will be described with reference to FIG. 8. As shown in FIG. 4A, with crosstalk, phenomena from the vertical direction and horizontal direction are dominant. Accordingly, in other words, several tenths of the signals of adjacent pixels vertically and horizontally can be subtracted from the signal of the pixel to be corrected as crosstalk amount. The output signals of a pixel to be corrected can be corrected by the following Expression (3).

[Mathematical Expression 3]

$$S\_crct(i,j) = S(i,j) - a \cdot S(i,j-1) - b \cdot S(i-1,j) - c \cdot S(i+1,j) - d \cdot S(i,j+1) \quad (3)$$

In the above Expression (3), S_crct represents the signal after correction, S represents the signal before correction, and in side the parentheses are the coordinate positions, respectively. (i, j) is one coordinates of the pixel to be corrected. Also, a, b, c, and d are correction coefficients as to adjacent pixels above, left, right, and below. These a, b, c, and d are also values indicating the proportion of the adjacent pixel signals being crosstalk amount.

In the event that the crosstalk amount is constant regardless of sheeting conditions or pixel position within the chip, the correction coefficients a, b, c, and d may also be constant. However, in reality, the crosstalk amount changes depending on the color temperature of the light source and optical conditions, and pixel position within the chip. Generally, as the crosstalk amount increases, the correction coefficients also become greater.

Figures 8, 9:
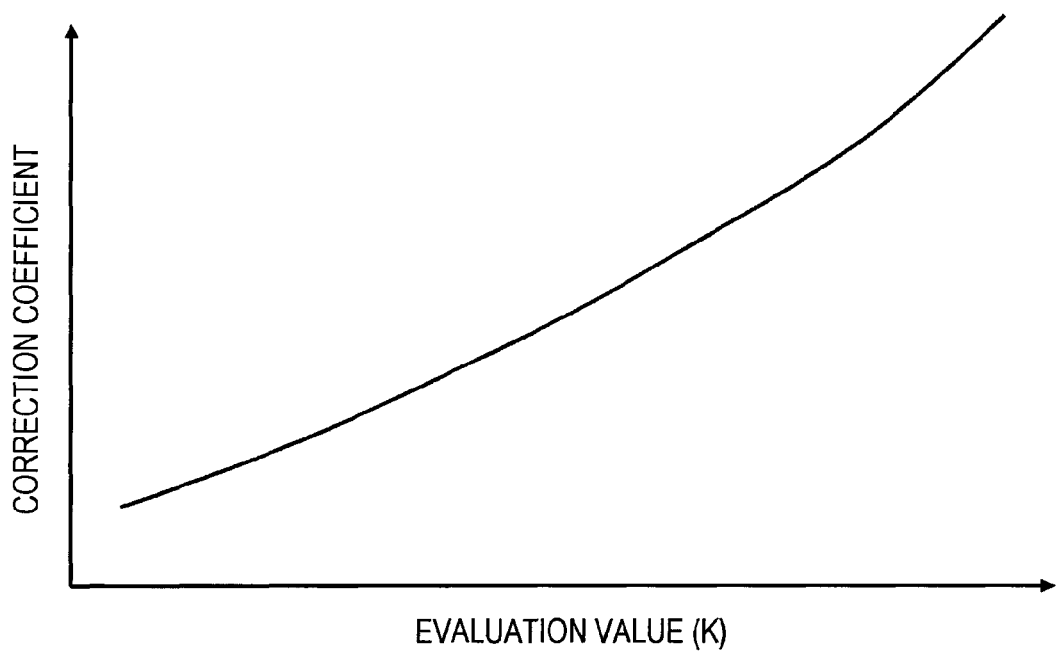
FIG. 8 is a diagram for describing a common crosstalk correction processing method.
FIG. 9 is a diagram illustrating an example of a relational expression between crosstalk amount evaluation values (K) and correction coefficients.

Accordingly, with the present embodiment, shooting is performed beforehand changing the optical conditions, illumination color temperature conditions, and so froth, correction coefficients are calculated corresponding to the output of the crosstalk amount calculating unit 1, i.e., to the evaluation value (K), and a relational expression such as shown in FIG. 9 is created. With the crosstalk correction coefficient calculating unit 2, upon the evaluation value (K) being output from the crosstalk amount calculating unit 1, such a relational expression is referenced to obtain correction coefficients corresponding to the crosstalk amount in the area where shooting is actually being performed.

Finally, description will be made regarding the crosstalk correction unit 3. As described above, with crosstalk, phenomena from the vertical direction and horizontal direction are dominant (see FIG. 4A). Accordingly, with the crosstalk correction unit 3, the signal of the pixel to be corrected is corrected by subtracting several tenths of the each of the signals of pixels adjacent vertically and horizontally, from the signal of the pixel to be corrected as crosstalk amount, following the correction expression shown in Expression (3) above for example, using the correction coefficients a, b, c, and d of the adjacent pixels calculated by the crosstalk correction coefficient calculating unit 2.

So far, a method has been described for calculating crosstalk correction coefficients for pixels to be corrected, with a size of around 4×4 pixels as the minimum increment. However, in reality there are cases wherein there is no need to calculate correction coefficients with such a fine granularity. Accordingly, a method for calculating correction coefficients with an image beforehand, or with a certain size, to handle processing of moving images, will be described below.

Figure 10:
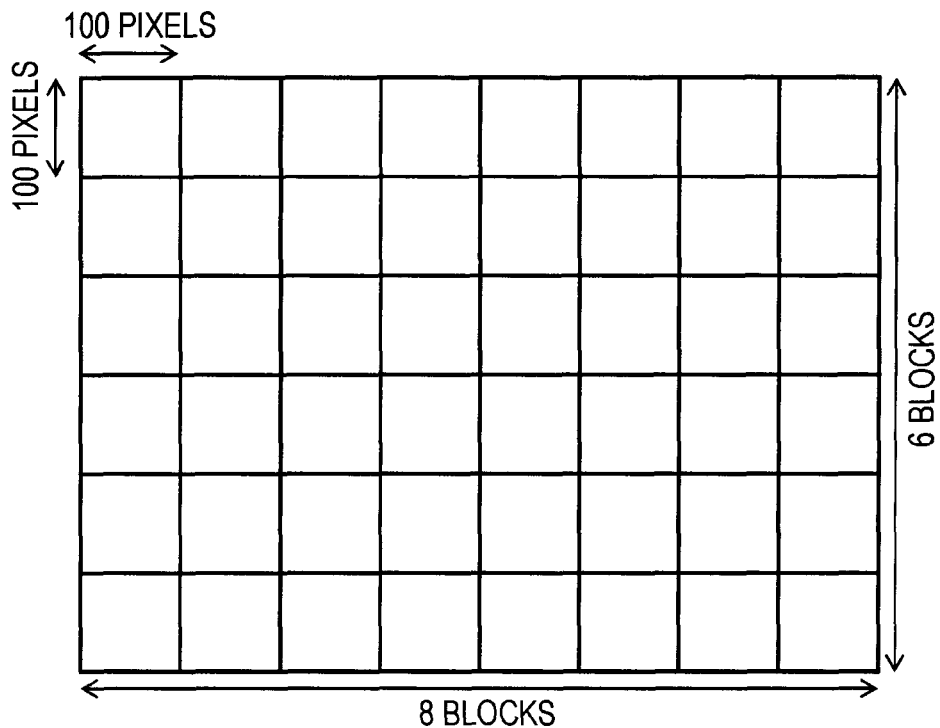
FIG. 10 is a diagram illustrating an example of a region (block) for calculating correction coefficients with magnitude of a certain degree.

FIG. 10 illustrates an example of a region (block) for calculating correction coefficients with a certain size. In the example in the drawing, we will say that each block is made up of 100×100 pixels, and one imaged image is made up of 6×8 blocks.

At the crosstalk amount calculating unit 1, upon calculating the average of the pixel values of each color of and white as processing for each block, the evaluation value (K) is calculated following the above Expression (1). Then at the downstream crosstalk correction coefficient calculating unit 2 and crosstalk correction unit 3, calculation of correction coefficients and pixel value correction processing are each performed.

Figure 11:
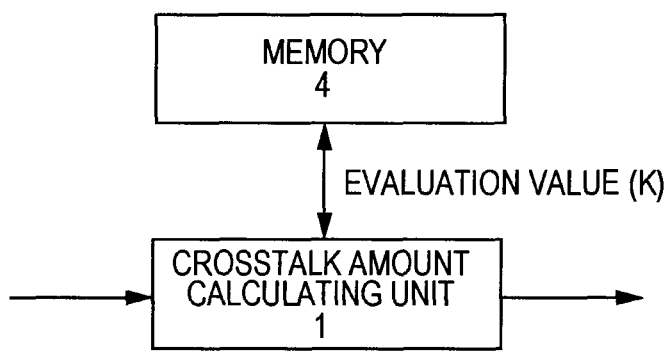
FIG. 11 is a diagram illustrating memory 4 for holding the evaluation value (K) calculated at a crosstalk correction calculating unit 1.

Now, as shown in FIG. 11, we will say that memory 4 is provided to hold the evaluation value (K) calculated at the crosstalk amount calculating unit 1. The evaluation value (K) calculated at the crosstalk amount calculating unit 1 is then saved in the memory 4, the evaluation value (K) is updated at a certain number of fixed intervals, and correction processing is performed on the imaged data. With 100×100 pixel blocks as the minimum increment, pixels of the same color within a processing increment have two or more outputs, so the average value of signal amount is preferably used to calculate the above Expression (4). The number of pixels for calculating the evaluation value (K) is great, so even if there is much noise included in the data, an accurate evaluation value (K) can be obtained by averaging.

[Mathematical Expression 4]

$$K = \frac{\text{average of } \alpha R + \text{average of } \beta G + \text{average of } \gamma B}{\text{average of } W\varepsilon} \quad (4)$$

Also, in the event that the difference in correction is conspicuous at boundary portions of the blocks in the image following having performed crosstalk correction, this portion can be made inconspicuous by averaging the correction coefficients between the adjacent blocks.

Figure 13C:
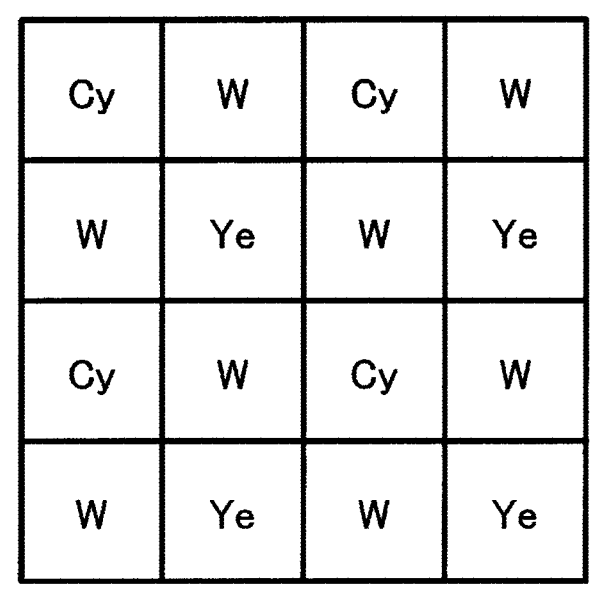

While description has been made so far regarding an embodiment of the present invention using the example shown in FIG. 12 as a filter array including white pixels, but the essence of the present invention is not restricted by color coding. For example, the evaluation value for knowing crosstalk amount can be calculated from shooting data alone for arrays with different RGB arrays such as shown in FIG. 13A and FIG. 13B, or arrays using complementary color filters instead of primary color filters as shown in FIG. 13C, for example, in the same way as described above, and crosstalk correction processing can be performed using correction coefficients adapted to his evaluation value.

Also, the present invention performs crosstalk correction of each pixel based on the evaluation results of crosstalk amount of white signals as to adjacent RGB signals (see FIG. 4B) and crosstalk amount of RGB signals as to adjacent white signals (see FIG. 4C), and in other words, white pixels are necessary for evaluating the crosstalk amount.

Figure 14:
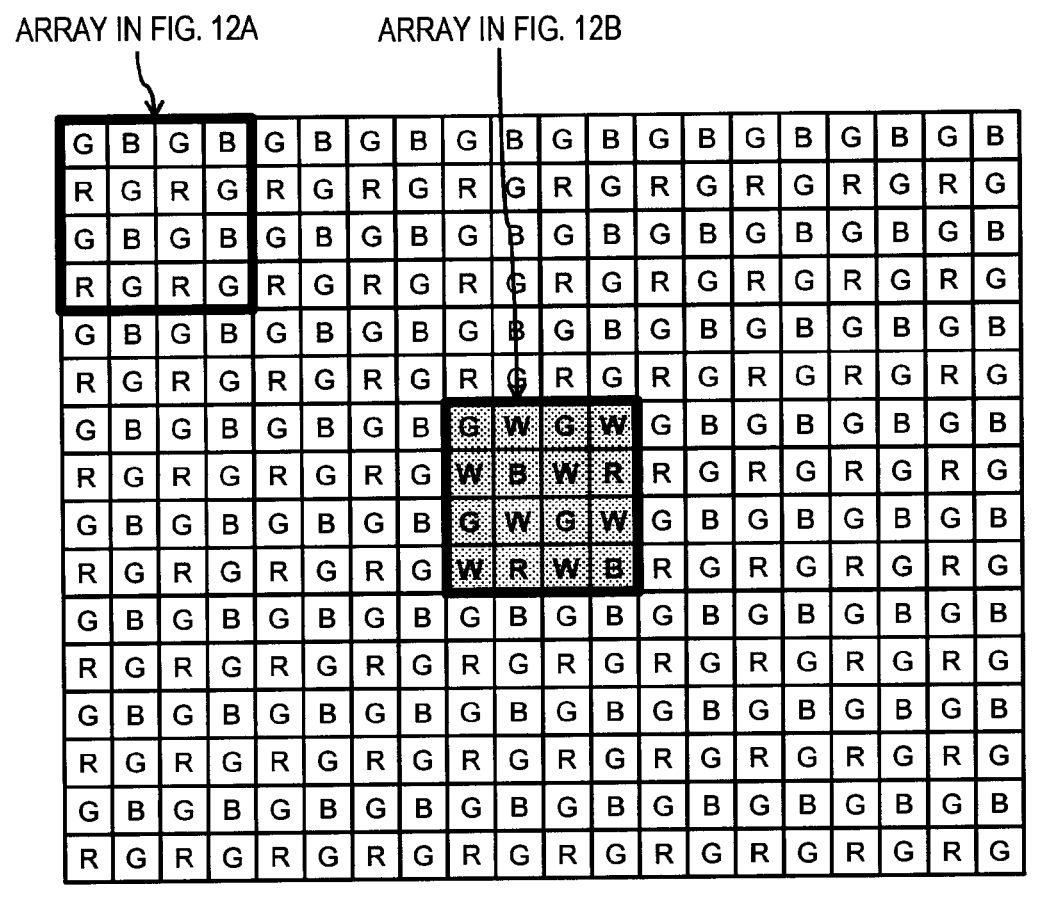

However, there is no need for the white pixels to be uniformly arrayed over the entire imaging device face, and calculation of crosstalk evaluation values can be performed simply by disposing white pixels in just a partial manner. FIG. 14 illustrates an example of a filter array in which arrays including white pixels such as shown in FIG. 12B are scattered throughout a Bayer array not including white pixels (see FIG. 12A). In such a case, crosstalk amount can be obtained from the array shown in FIG. 12B, and the crosstalk within the Bayer array can be corrected based on the crosstalk correction coefficients calculated using this crosstalk amount.

Figure 15:
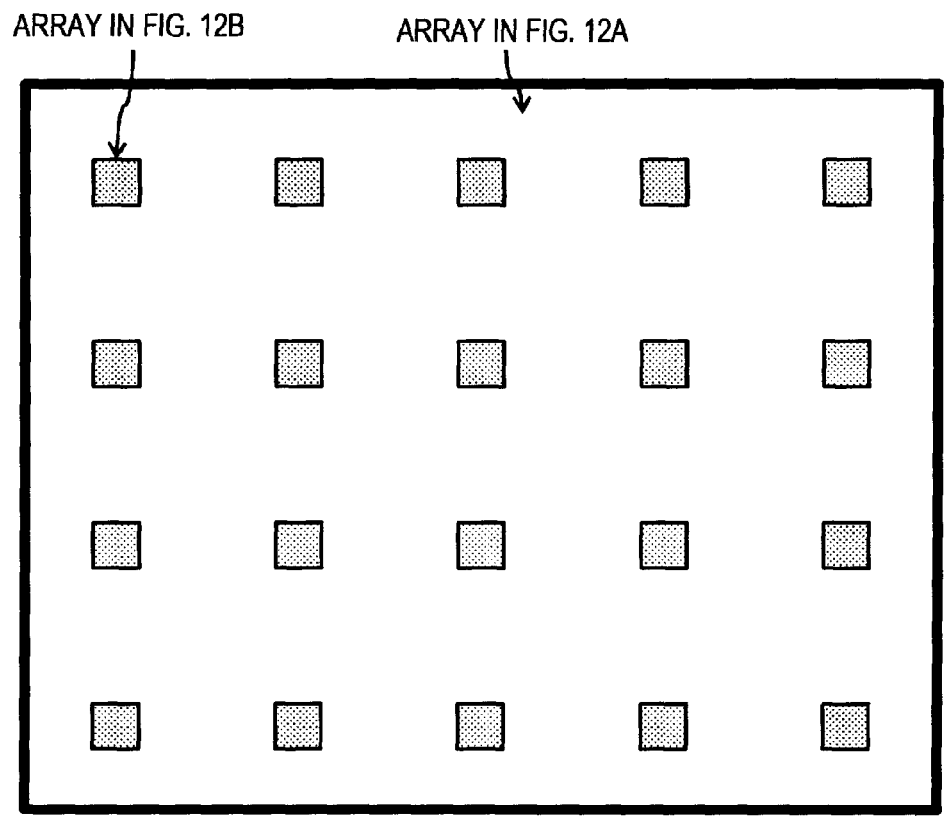
FIG. 15 is a diagram schematically illustrating the way in which multiple evaluation value calculating arrays such as shown in FIG. 12B are disposed on an imaging device face based on the Bayer array shown in FIG. 12A.

FIG. 15 schematically illustrates the way in which multiple evaluation calculating arrays such as shown in FIG. 12B are disposed on the imaging device face based on a Bayer array (see FIG. 12A). Evaluating each crosstalk amount using each evaluation calculating array allows the degree of crosstalk to be known over the entire face of the imaging device. Crosstalk then can be adaptively corrected in each region by deciding crosstalk correction coefficients based on the evaluation value of the crosstalk amount obtained from a nearby evaluation calculating arrays.

Now, the relation between crosstalk amount evaluation value and correction coefficients is obtained beforehand, as shown in FIG. 9. The relation between the evaluation value and correction coefficients may be obtained for each evaluation calculating arrays.

The crosstalk correction in each region can be performed using the above Expression (3). Alternatively, crosstalk correction may be performed following the matrix operation shown in the following Expression (5), after performing interpolation processing at the interpolation processing circuit 23 (see FIG. 1).

[Mathematical Expression 5]

$$\begin{pmatrix} R'_i \\ G'_i \\ B'_i \end{pmatrix} = \begin{pmatrix} R_{11} & G_{12} & B_{13} \\ R_{21} & G_{22} & B_{23} \\ R_{31} & G_{32} & B_{33} \end{pmatrix} \begin{pmatrix} R_i \\ G_i \\ B_i \end{pmatrix} \quad (5)$$

Figure 16:
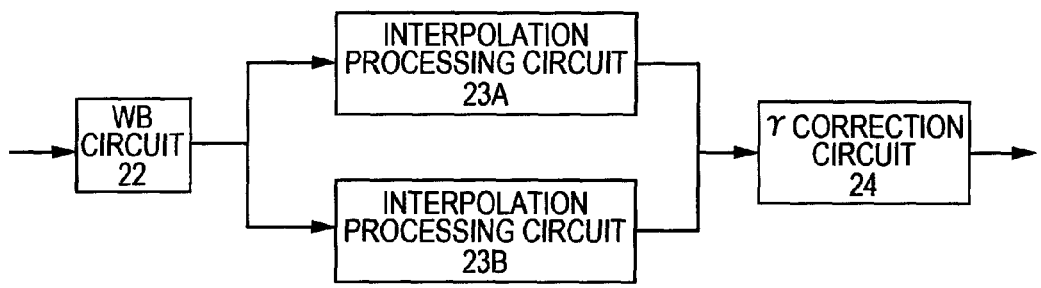
FIG. 16 is a diagram schematically illustrating the way in which multiple evaluation value calculating arrays such as shown in FIG. 12B are disposed on an imaging device face based on the Bayer array shown in FIG. 12A.

R', G', B': Signals following correction
R, G, B: Signals before correction
$R_{11}, G_{12}, B_{13}, R_{21}, G_{22}, B_{23}, R_{31}, G_{32}, B_{33}$: Correction coefficients
i: position of pixel in imaging device array In the event that the pixel array of the imaging device is partially different as shown in FIG. 15, the interpolation circuit 23 needs to be changed. The interpolation method can be switched at predetermined pixel positions for this changing. FIG. 16 illustrates a configuration example of an imaging device for switching the interpolation method according to the pixel position. Note however, that only relevant parts are extracted and shown in this drawing. Interpolation processing can be performed at an interpolation circuit 23A at pixel position following the Bayer array, and switched to interpolation processing at the interpolation circuit 23 for pixel positions for the evaluation value calculation arrays (see FIG. 12B).

INDUSTRIAL APPLICABILITY

While the present invention has been described in detail with reference to a particular embodiment, it is self-evident that one of ordinary skill in the art can make modifications and substitutions to the embodiment without departing from the essence of the present invention. The present invention can be applied to, for example, a camera apparatus such as a digital still camera or video camera, various types of electronic equipment in which a camera module is implemented, such as cellular telephones, and so forth.

While an embodiment of the present invention has been described in the Present Description using the example shown in FIG. 12 as a filter array including white pixels, the essence of the present invention is not restricted to this. For example, the evaluation value for knowing crosstalk amount can be calculated from shooting data alone for arrays with different RGB arrays such as shown in FIG. 13A and FIG. 13B, or arrays using complementary color filters instead of primary color filters as shown in FIG. 13C, for example, in the same way as described above, and crosstalk correction processing can be performed using correction coefficients adapted to this evaluation value.

In short, the present invention has been disclosed exemplarily, and the contents of description within the Present Description should not be interpreted restrictively. The Claims should be taken into consideration to determined the essence of the present invention.

REFERENCE SIGNS LIST 1 crosstalk amount calculating unit
2 crosstalk correction coefficient calculating unit
3 crosstalk correction unit
10 imaging apparatus
11 imaging lens
12 imaging device
13 A/D converter (ADC)
14 camera signal processing circuit
21 optical system correcting unit
22 WB (white balance) circuit
23 interpolation processing unit
24 gamma correction circuit
25 Y-signal processing circuit
26 C-signal processing circuit
27 band limiting LPF (low-pass filter)
28 thinning out circuit

The invention claimed is:

1. An image processing device comprising:
a crosstalk amount calculating unit for calculating an evaluation value of crosstalk amount included in an output signal from a pixel to be corrected in an imaging device;
a crosstalk correction coefficient calculating unit for calculating a crosstalk correction coefficient based on the evaluation value output from said crosstalk amount calculating unit; and
a crosstalk correcting unit for eliminating crosstalk amount included in an output signal of said pixel to be corrected, using said crosstalk correction coefficient,
wherein the crosstalk correcting unit subtracts, from an output signal of a pixel to be corrected, a value obtained by multiplying the output signal of a pixel adjacent to said pixel to be corrected by said crosstalk correction coefficient, thereby eliminating amount of crosstalk.

2. The image processing device according to claim 1, wherein said crosstalk amount calculating unit calculates the evaluation value of crosstalk amount included in an output signal of said pixel to be corrected, based on output signals from the imaging device.

3. The image processing device according to claim 1, wherein said crosstalk amount calculating unit calculates the evaluation value of crosstalk amount included in an output signal of said pixel to be corrected, based on the relation of output signals between adjacent pixels.

4. The image processing device according to claim 1, wherein said imaging device uses color coding including white pixels.

5. The image processing device according to claim 4, wherein said crosstalk amount calculating unit calculates an evaluation value for crosstalk amount included in an output signal of a pixel to be corrected, based on the proportion of the sum of the signal amount of the pixels other than white, as to the signal amount of white pixels.

6. The image processing device according to claim 4, wherein said crosstalk amount calculating unit calculates an evaluation value for the relative amount of crosstalk included in an output signal of a pixel to be corrected, based on the proportion of the sum of values obtained by multiplying the signal amounts of each of RGB pixels by respective predetermined coefficients ($\alpha$, $\beta$, $\gamma$), as to a value obtained by multiplying the signal amount of white pixels by a predetermined coefficient ($\epsilon$).

7. The image processing device according to claim 4, wherein said crosstalk amount calculating unit calculates an evaluation value of crosstalk amount, with N×N pixels as an increment of processing (where N is a positive integer).

8. The image processing device according to claim 7, further comprising memory for storing evaluation values which said crosstalk amount calculating unit has calculated in increments of processing;
wherein said crosstalk correction coefficient calculating unit and said crosstalk correcting unit respectively perform calculation of correction coefficients and correction of crosstalk, using the evaluation values calculated using previous frames saved in said memory.

9. The image processing device according to claim 1, wherein said crosstalk correction coefficient calculating unit calculates beforehand a relational expression between the evaluation value of crosstalk amount calculated by said crosstalk amount calculating unit, and correction coefficients, and at the time of an evaluation value output from said crosstalk amount calculating unit being output, references said relational expression and calculates a correction coefficient corresponding to said evaluation value.

10. The image processing device according to claim 1, wherein said imaging device includes a plurality of arrays for calculating evaluation values including white pixels, in an array not including white pixels.

11. The image processing device according to claim 10,
wherein said crosstalk amount calculating unit uses each of said arrays for calculating evaluation values to calculate evaluation values of crosstalk amount occurring at relevant positions; and
wherein said crosstalk correction coefficient calculating unit calculates a crosstalk correction coefficient based on the evaluation value output from said crosstalk amount calculating unit, for each position where an array for calculating evaluation values is disposed; and
wherein said crosstalk correcting unit performs correction of crosstalk using a relevant coefficient, within an array for calculating evaluation values, and performs correction of crosstalk using a crosstalk correction coefficient determined based on an evaluation value of crosstalk amount obtained from a nearby array for calculating evaluation values, in a region outside of an array for calculating evaluation values.

12. An image processing method comprising:
a crosstalk amount calculating step for calculating an evaluation value of crosstalk amount included in an output signal from a pixel to be corrected in an imaging device;
a crosstalk correction coefficient calculating step for calculating a crosstalk correction coefficient based on the evaluation value output in said crosstalk amount calculating step; and
a crosstalk correcting step for eliminating crosstalk amount included in an output signal of said pixel to be corrected, using said crosstalk correction coefficient,
wherein the crosstalk correcting step further comprises subtracting, from an output signal of a pixel to be corrected, a value obtained by multiplying the output signal of a pixel adjacent to said pixel to be corrected by said crosstalk correction coefficient, thereby eliminating amount of crosstalk.

13. An imaging apparatus comprising:
an imaging device including a color coding color filter; and
a signal processing unit for processing output signals of said imaging device;
wherein said signal processing unit includes
a crosstalk amount calculating unit for calculating an evaluation value of crosstalk amount included in an output signal from a pixel to be corrected in said imaging device,
a crosstalk correction coefficient calculating unit for calculating a crosstalk correction coefficient based on the evaluation value output from said crosstalk amount calculating unit, and
a crosstalk correcting unit for eliminating crosstalk amount included in an output signal of said pixel to be corrected, using said crosstalk correction coefficient,
wherein the crosstalk correcting unit subtracts, from an output signal of a pixel to be corrected, a value obtained by multiplying the output signal of a pixel adjacent to said pixel to be corrected by said crosstalk correction coefficient, thereby eliminating amount of crosstalk.

14. A computer program embodied on a non-transitory and computer readable medium, when executed by at least one processor, causes the computer to perform function as:
a crosstalk amount calculating unit for calculating an evaluation value of crosstalk amount included in an output signal from a pixel to be corrected in said imaging device,
a crosstalk correction coefficient calculating unit for calculating a crosstalk correction coefficient based on the evaluation value output from said crosstalk amount calculating unit, and
a crosstalk correcting unit for eliminating crosstalk amount included in an output signal of said pixel to be corrected, using said crosstalk correction coefficient,
wherein the crosstalk correcting unit subtracts, from an output signal of a pixel to be corrected, a value obtained by multiplying the output signal of a pixel adjacent to said pixel to be corrected by said crosstalk correction coefficient, thereby eliminating amount of crosstalk.

* * * * *